United States Patent [19]
Bajaj

[11] Patent Number: 6,102,584
[45] Date of Patent: Aug. 15, 2000

[54] FIBER ORIENTATION MECHANISM

[75] Inventor: Inder K. Bajaj, Fremont, Calif.

[73] Assignee: Seagate Technology, Inc., Scotts Vallley, Calif.

[21] Appl. No.: 09/109,316

[22] Filed: Jul. 1, 1998

[51] Int. Cl.[7] .................................................. G02B 6/255
[52] U.S. Cl. .............................. 385/97; 385/95; 385/97; 385/134; 385/137
[58] Field of Search .................................. 385/136, 137, 385/52, 11, 95, 96, 97, 98

[56] References Cited

U.S. PATENT DOCUMENTS

| | | | |
|---|---|---|---|
| 4,832,438 | 5/1989 | Engel et al. .............................. | 385/97 |
| 5,611,015 | 3/1997 | Tokumaru et al. ...................... | 385/98 |
| 5,659,645 | 8/1997 | Satake ..................................... | 385/52 |
| 5,926,594 | 7/1999 | Song et al. .............................. | 385/52 |

FOREIGN PATENT DOCUMENTS

| | | | |
|---|---|---|---|
| 0054910 | 4/1982 | Japan ..................................... | 385/97 |
| 0075508 | 4/1987 | Japan ..................................... | 385/52 |
| 0272207 | 11/1987 | Japan ..................................... | 385/96 |
| 0272210 | 11/1987 | Japan ..................................... | 385/136 |
| 0256905 | 10/1988 | Japan ..................................... | 385/11 |
| 0254905 | 10/1989 | Japan ..................................... | 385/96 |
| 0279210 | 11/1989 | Japan ..................................... | 385/11 |
| 0196204 | 8/1990 | Japan ..................................... | 385/137 |
| 0296203 | 12/1990 | Japan ..................................... | 385/96 |
| 404226406A | 8/1992 | Japan ..................................... | 385/52 |
| 2194074A | 2/1988 | United Kingdom ................... | 385/137 |

*Primary Examiner*—Cassandra Spyrou
*Assistant Examiner*—John Juba, Jr.
*Attorney, Agent, or Firm*—Edward P. Heller, III; Raghunath S. Minisandram

[57] ABSTRACT

A fiber rolling mechanism is provided to rotate a single optical fiber along its axis so as to align markers placed in the fiber to other fiber's relative markers.

1 Claim, 7 Drawing Sheets

FIBER ORIENTATION MECHANISM

FIELD OF THE INVENTION

The present invention relates generally to the optical switching of light, and more particularly to the optical switching of light in an optical data storage and retrieval system.

BACKGROUND ART

A number of optical switch technologies are currently used for controlling the passage of light through fiber optics. With one technology, electric current is applied to a polymer to create a thermal effect that changes the refractive index of a polymer. As the refractive index changes, a light beam passing through the polymer is selectively routed from an input to an output. Another optical switch is micro-machined in silicon and uses a thermally activated actuator to mechanically move a single send optical fiber relative to two receive optical fibers.

Still another micro-machined optical switch uses a cantilevered micro-machined mirror that is electrostatically positioned between a stopped and unstopped position. While this mirror may deflect light between two optical fibers, as with the aforementioned switch designs, it also is capable of optical alignment in only one dimension.

More recently, an optical switch (disclosed in commonly assigned U.S. Application Ser. No. 60/059,456 and which is incorporated herein by reference) was designed that uses an actuator assembly to transfer a light signal from an input port to an output port selected from a number of N options. Alternatively, the optical switch routes a reflected laser beam from a particular one of the N output ports towards the input port. In this assembly, the optical switch includes an actuator assembly and an imaging assembly. The laser source transmits the outgoing laser beam towards the actuator assembly. The outgoing laser beam is displaced by a rotational movement of the actuator assembly about one or two axes so as to be incident onto approximately the same location of a front surface of the imaging assembly and with a particular angular orientation relative to a central optical axis. The imaging assembly is coupled to an optical fiber bundle assembly that comprises a housing and a set of optical fibers. The optical fibers each comprise an outer sheathing which contains radial markers. The fibers are arranged as a closely packed hexagonal structure (as viewed in a cross-section in FIG. 5). The proximal ends of the optical fibers and the front face of the housing are subsequently polished as a unit to provide a planar surface for later coupling of the optical fiber bundle assembly to the back surface of the imaging assembly. The polarization axes of all the optical fibers are aligned relative to one another. The set of optical fibers comprises a set of single mode polarization maintaining (SMPM) optical fibers to carry the light signal. What is needed for optical switch manufacture is a mass production method that aligns the polarization axes of all the optical fibers in a switch relative to each other.

SUMMARY OF THE INVENTION

In the present invention, a single optic fiber is placed between two surfaces and rotated by translating those surfaces in the same plane but in opposite directions or one surface may be stationary. Both surfaces will have a coated or bonded-on elastomer to protect the optical fiber during its manipulation. In the present invention, one surface is moved relative to the other using a finely threaded dial pin or micrometer head for precise linear movement. A spring is placed against the side of the sliding or moving component to maintain its position as set by the extended or retracted dial pin and therefore maintain the angular orientation of the optic fiber. A clamping feature is provided for holding and releasing the optic fiber within the mechanism, this clamping force is created by a second spring selected so as to hold the optical fiber yet allow it to roll during manipulation without damage. The fiber, being in contact with both the fixed and moving surfaces, will rotate one direction or the other as the surface translates forward or backward.

In this manner, optical switches can have their fibers aligned so that the polarity of light emerging from one fiber can be directed into another fiber without any shift in polarity. In an optical switch, an assembly directs a beam of light between an input port and a number of output ports. All of the fibers within the switch must be aligned in the same orientation relative to the polarity of the light. To accomplish this, each fiber is manufactured with two fine dots or markers visible under a microscope. FIG. 5 depicts a group of fibers, contained in a collar, which have all their markers aligned relative to each other. The present invention allows for the mass production of optical switches with the desired optical fibers properly aligned relative to these markers using multiple fiber rotation assemblies attached to a base.

DETAILED DESCRIPTION OF THE PREFERRED EMBODIMENTS

Figure 1:
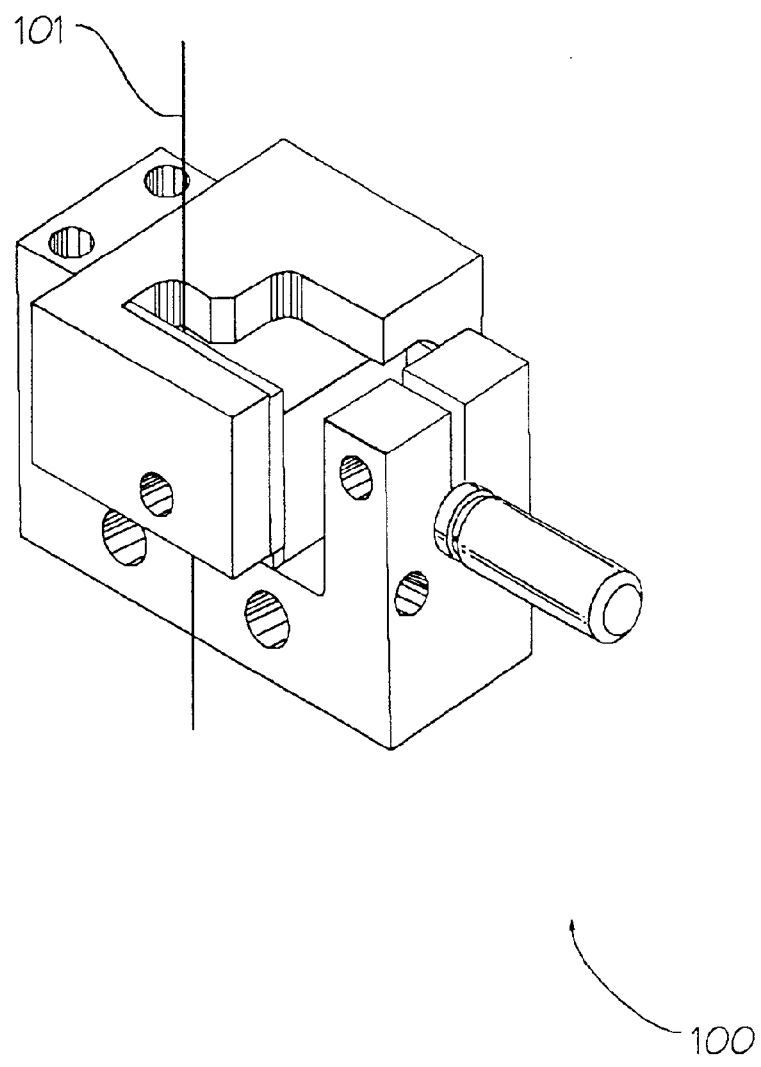
FIG. 1 is a perspective view of an optical fiber alignment or single fiber-rolling mechanism with a single fiber installed.
Figure 2:
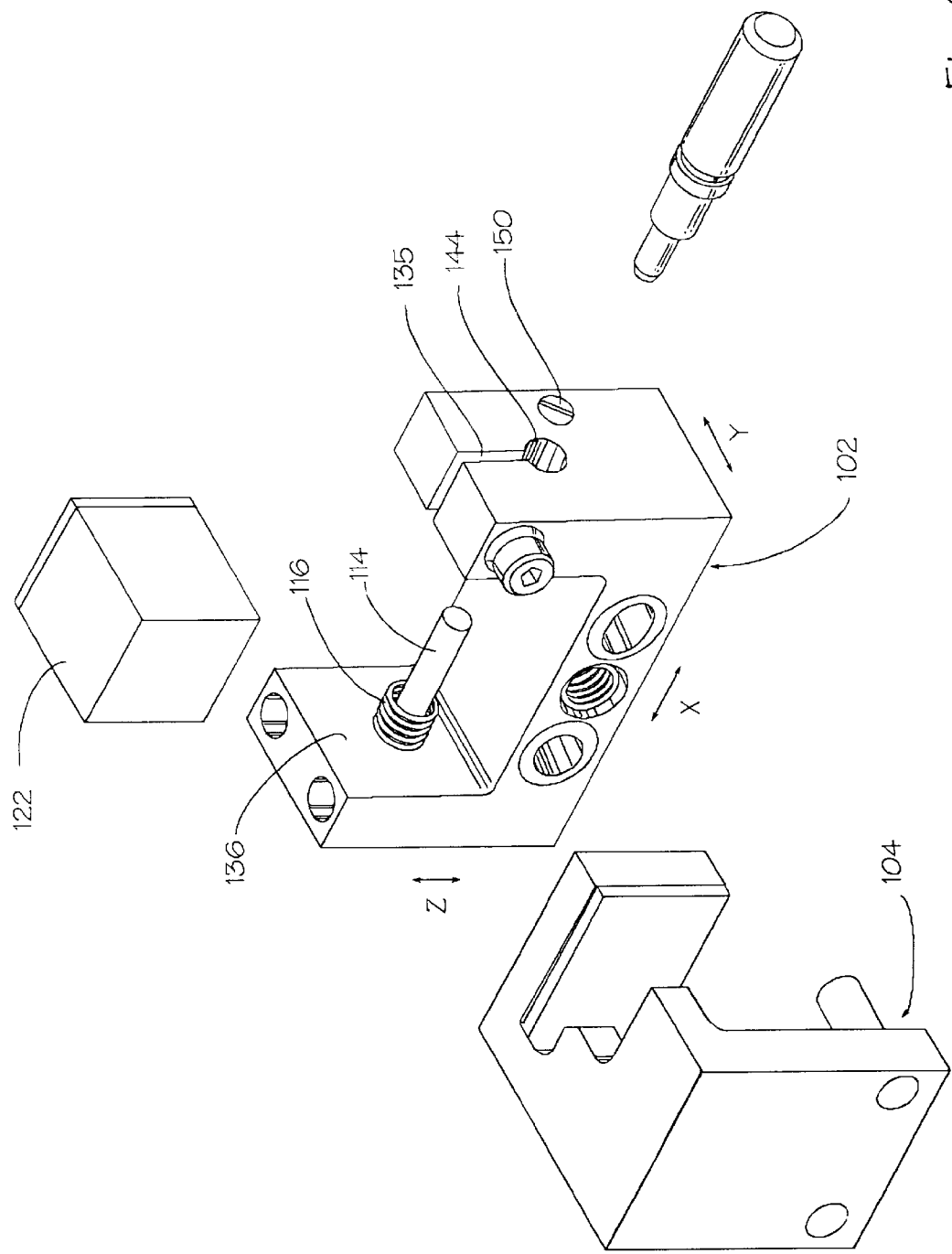
FIGS. 2–4 are exploded perspective views, offering different viewing angles, of a single fiber-rolling mechanisms and show the "U" shaped bracket, the channel, elastomeric pads, pins, springs, bolts, and dial pin of the present invention.
Figure 3:
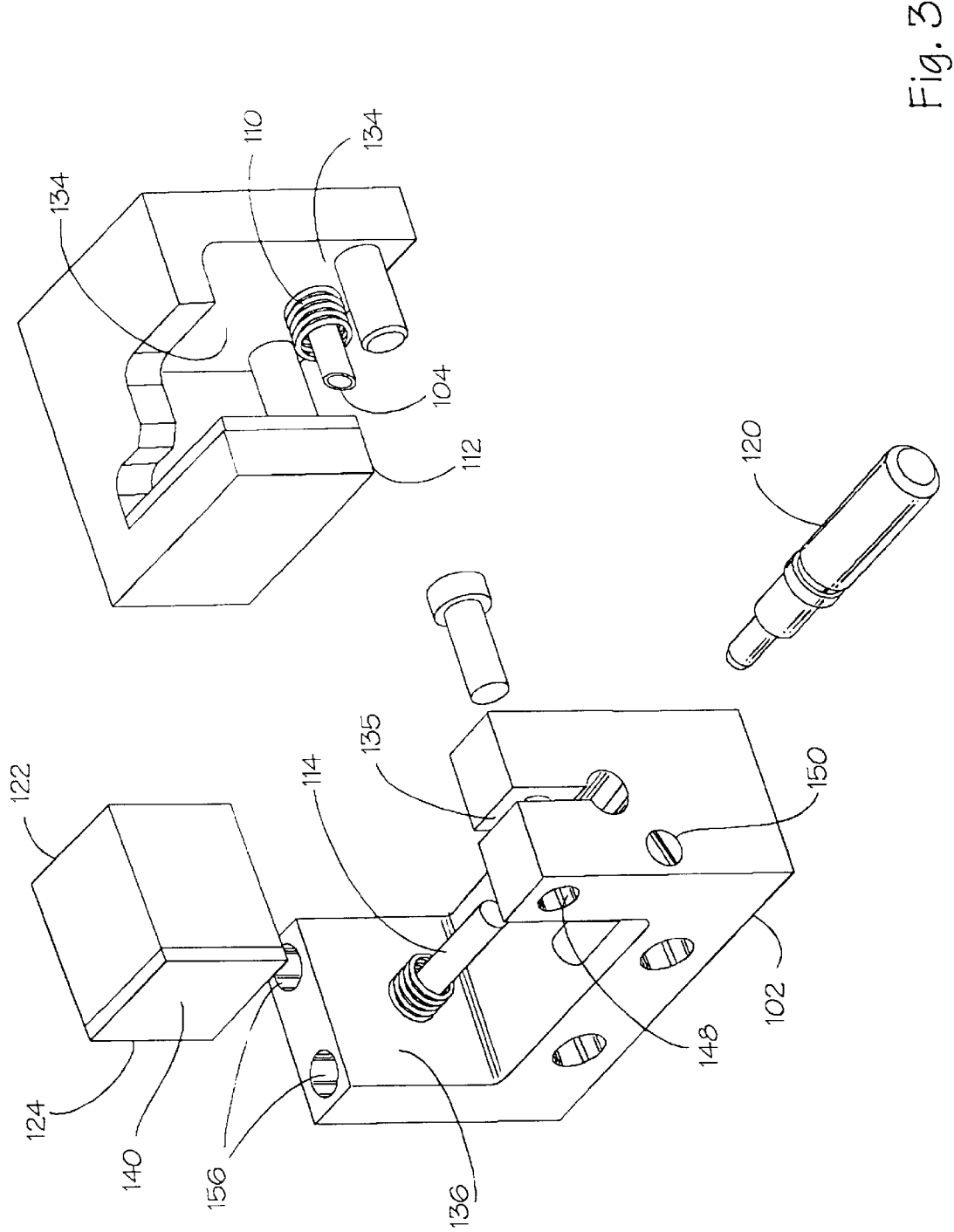
Figure 4:
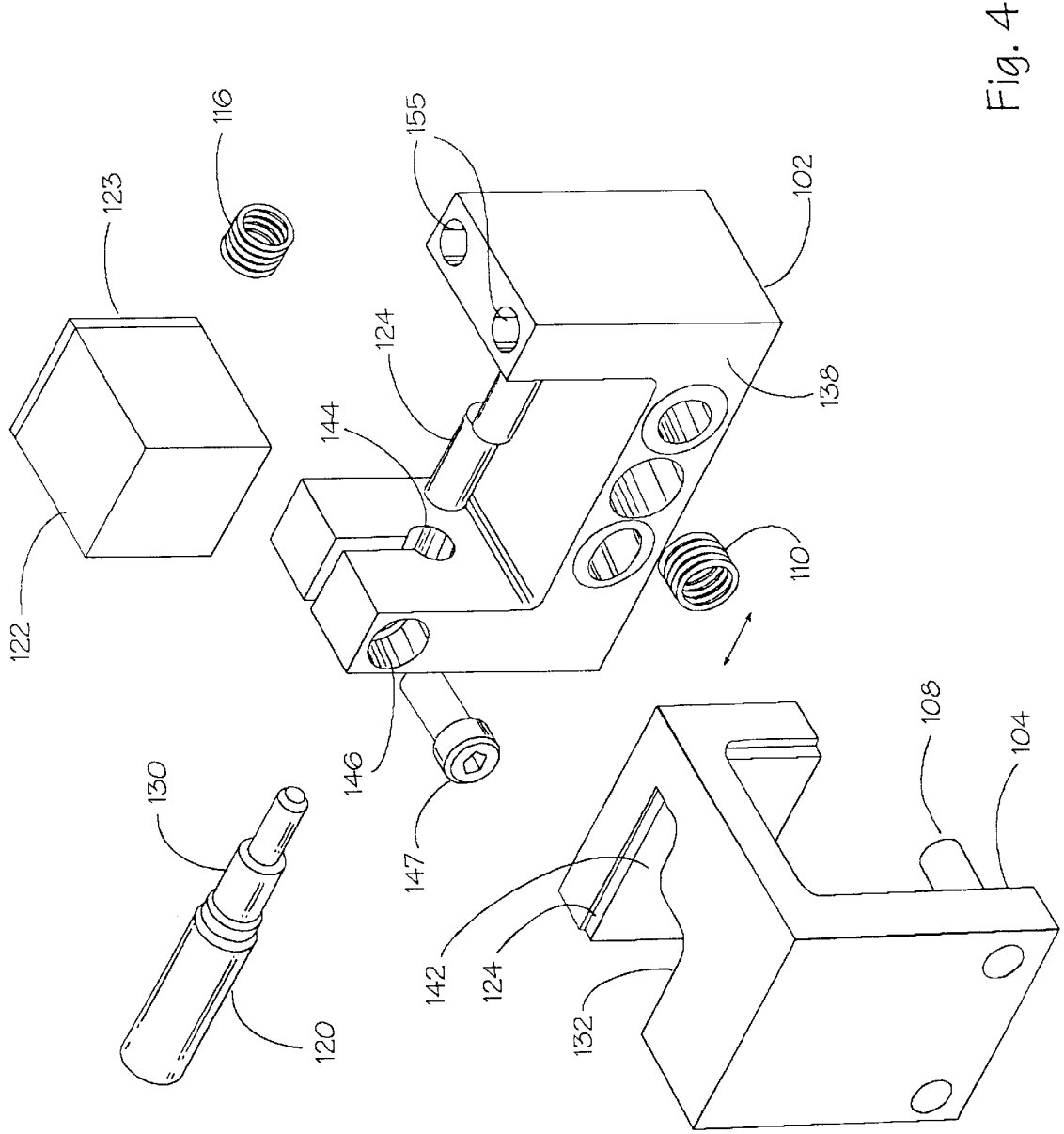
Figure 5:
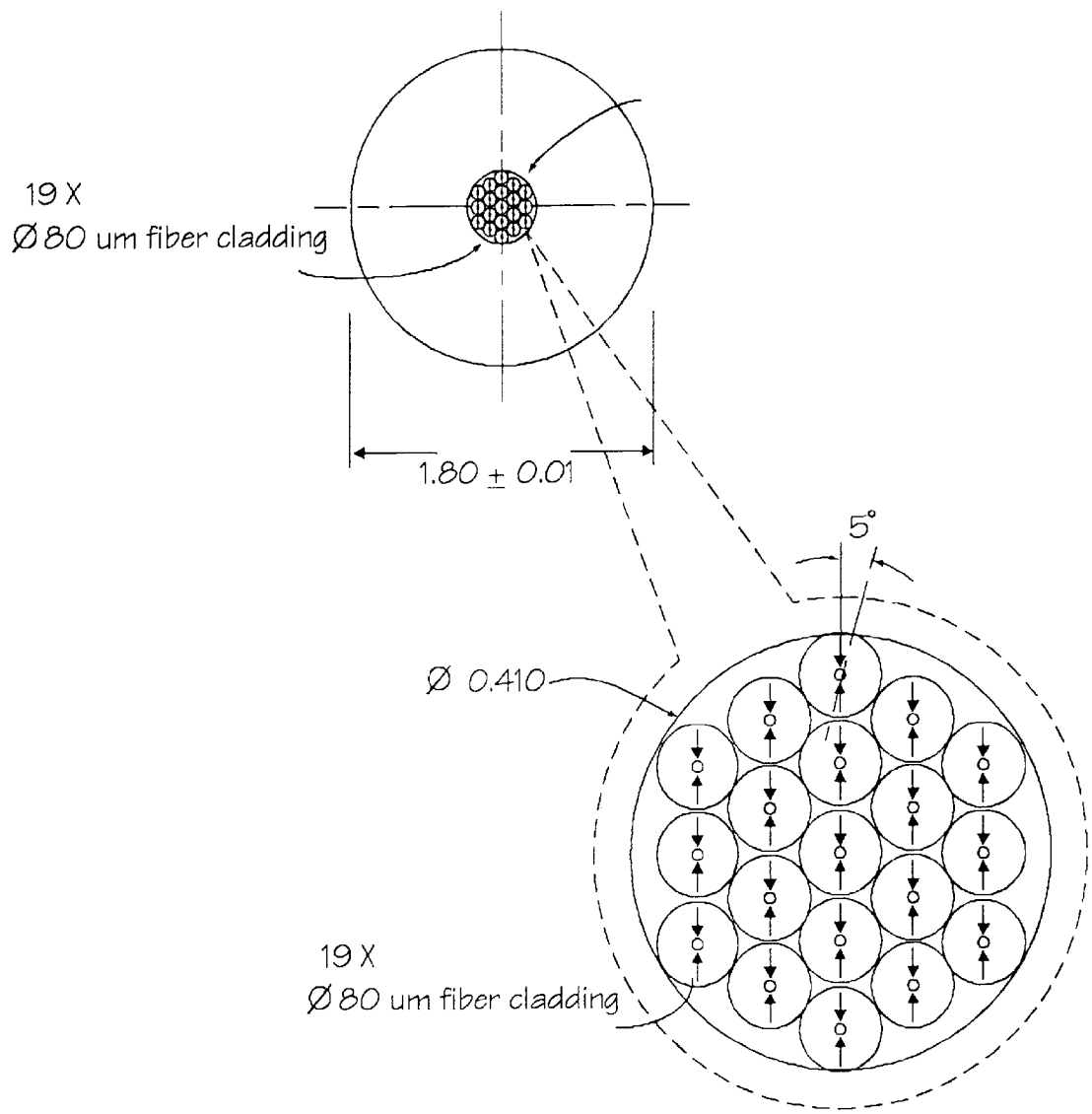
FIG. 5 illustrates a group of optical fibers in a bundle, with uniformly aligned markers.
Figure 6:
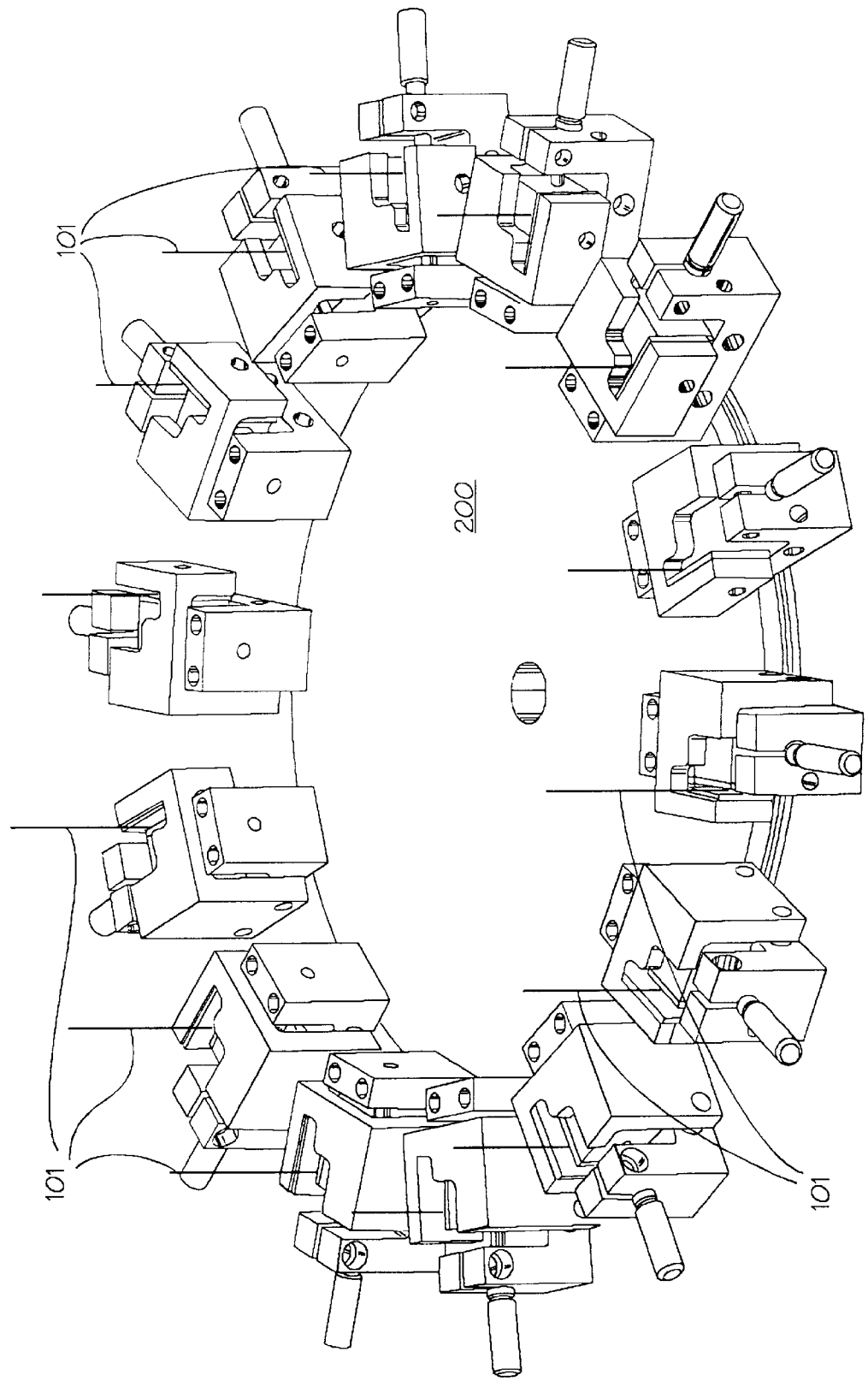
FIG. 6 shows a perspective view of a number of optical fiber alignment mechanisms assembled on a base.
Figure 7:
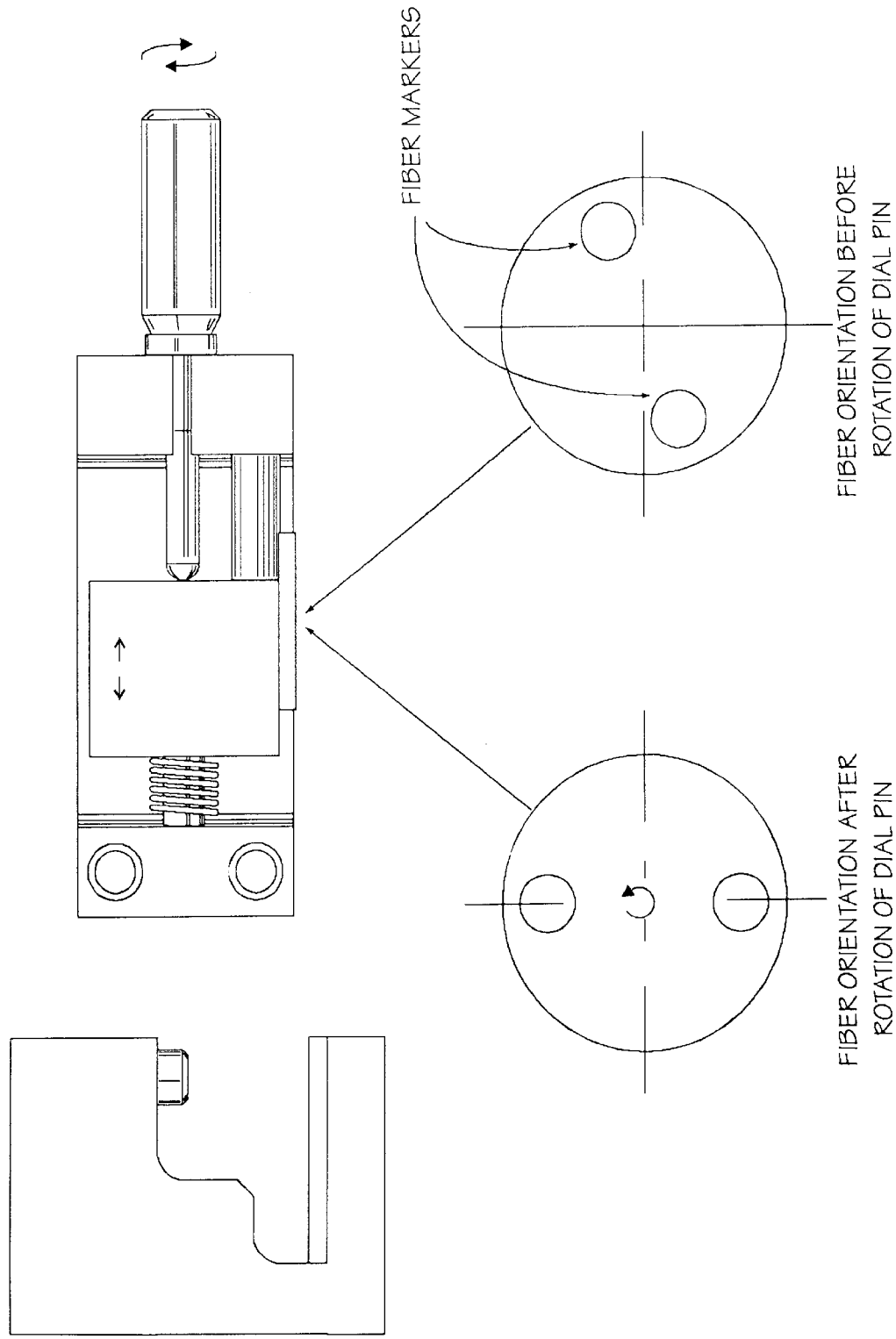
FIG. 7 illustrates an assembled optical fiber alignment mechanism rotating a fiber CCW by extending the dial pin.

Referring in detail to the drawings wherein similar parts of the invention are identified by like reference numerals, there is seen in FIG. 1 (bolts not shown) a perspective view of a single fiber rolling mechanism 100 of the present invention with a single optical fiber 101 in place. An exploded view of mechanism 100 is provided in FIGS. 2–4 (some bolts not shown) and includes a "U" shaped bracket 102 upon which is mounted all of the active components of the device. A channel 104 with a cutout feature 132 is attached by a cross pin or dowel 108 to bracket 102 and is free to move a distance in the 'Y' direction (FIG. 2) on the cross pin 108 which also serves to retain the channel 104 to the bracket 102. A spring $k_1$ 110 is placed over a pin 112 and located between channel surface A 134 and bracket surface B 132. A second spring $k_2$ 116 is located on a sliding pin or main axis dowel 114 and rests between the bracket side A 136 and sliding block surface B 138 when assembled. The slide block 122 is installed by placing the slide block hole 123 onto the sliding pin 114 after spring $k_2$ 116 is installed. The sliding block 122 is then free to move a limited distance in the 'X' direction. Elastomer pads 124 are bonded onto channel side B 142 and sliding block surface A 140. A micrometer head or fine feeding dial pin 120 is clamped by its collar 130 into a slotted 135 through-hole 144 located at one end of the bracket 102. This clamping is accomplished by tightening a bolt 147 placed through hole 146 and threaded into hole 148. A travel limiting screw 124 is located in a threaded through-hole 150 placed near the dial pin 120. Each fiber rolling mechanism 100 is mounted to a base 200 (FIG. 6) using bolts (not shown) placed through holes 156 located in one end of the bracket 102.

Referring to FIG. 1 wherein a fully assembled mechanism 100 is displayed with a fiber 101 installed. A fiber 101 is installed into the mechanism 100 by manually moving the channel 104 in the 'Y' direction thus opening up the two elastomeric surfaces 140 & 142, the install operation being aided by a channel cutout 132. The fiber 101 is positioned between these surfaces and generally perpendicular to the 'Y' plane and then the channel is released to allow the clamping force $k_1$ to grip the fiber. Once the dial pin 120 is clamped using a screw 147 through hole 146 and threaded into hole 148 in the bracket 102, rotation of the dial will extend or retract a pin which translates the sliding block 122 thereby rotating the fiber 101. Spring 116 provides a force $k_2$ which maintains block contact with the pin upon retraction as well as overcomes the block 122 sliding friction enhanced by spring 110 force $k_1$. The dial pin mechanism 120 is finely threaded and includes a vernier scale for the precise indication of small amounts of pin travel. A pin or screw 124 is threaded into hole 150 to limit sliding block 122 travel in the pin retraction direction (keeps sliding block 122 on the sliding pin 114) and the depth of sliding block 122 hole 123 limits travel in the opposite or pin extension direction (limits spring 116 compression). Through the use of bolts (not shown) and mounting holes 156, multiple mechanisms 100 can be installed on a base 200 per FIG. 6, for polarity alignment of multiple fibers relative to each other.

What is claimed is:

1. An apparatus comprising:

a non-moveable flat surface and a moveable flat surface; wherein a first spring is positioned to provide a clamping force between the fixed and moving surfaces to grip, or release a fiber; wherein the moveable surface is free to slide along a pin that lies parallel to the fixed surface so as to direct movement in one plane; wherein a threaded dial device which extends or retracts a pin when the dial is rotated is positioned to push or retract the pin against the moveable surface; wherein a second spring is placed to maintain a force on the moving surface against the dial pin when extended or retracted; wherein surfaces that contact the fiber are elastomeric; and wherein when the surface is moved, the fiber rolls in a controlled manner.

\* \* \* \* \*